United States Patent Office 3,784,671
Patented Jan. 8, 1974

3,784,671
PROCESS FOR THE RECOVERY OF ANTIMONY PENTACHLORIDE FROM CATALYST SOLUTIONS
Egon Joerchel and Rudolf Kohlhaas, Frankfurt am Main, Germany, assignors to Farbwerke Hoechst Aktiengesellschaft vormals Meister Lucius & Bruning, Frankfurt am Main, Germany
No Drawing. Filed Nov. 16, 1971, Ser. No. 199,301
Claims priority, application Germany, Mar. 6, 1971, P 21 10 797.1
Int. Cl. C01b 29/00
U.S. Cl. 423—88      7 Claims

ABSTRACT OF THE DISCLOSURE

The invention relates to a process of recovering antimony pentachloride from catalyst solutions used for the fluorination of chlorine containing hydrocarbons. The process is based upon a thermal decomposition of antimony pentachloride into antimony trichloride and chlorine at a temperature of 60° to 300° C. The organic impurities are extracted from the precipitated antimony trichloride by means of halogenated hydrocarbons. The remaining antimony trichloride is reoxidized with chlorine—which may be recycled from the step of the thermal decomposition—at a temperature of from 60° to 150° C. and a pressure of zero to five atmospheres to yield antimony pentachloride which is refined by distillation.

---

The present invention relates to a process for the recovery of $SbCl_5$ from contact solutions used for the fluorination of chlorinated hydrocarbons. The $SbCl_5$ contained in the catalyst solution is thermally reduced to $SbCl_3$, separated from the organic impurities and, after rechlorination of the $SbCl_3$ to $SbCl_5$, it is separated from the inorganic impurities by distillation.

It is known to use antimony pentachloride ($SbCl_5$) as catalyst for the fluorination of halogenated hydrocarbons of the $CX_4$ and $C_2X_6$ types, where X is hydrogen and/or chlorine (U.S. Pat. No. 3,381,044). In practical use, however, the catalyst solution, after a certain working period, looses its activity because accompanying substances are accumulated, and it has to be worked up. Organic, deactivating compounds are continuously introduced in small amounts into the reaction mixture by the chlorinated hydrocarbons, while inorganic impurities predominantly originate from the reactor material. A work-up of the exhausted catalyst solutions is necessary for reasons of economy and in order to remove waste products.

According to a known process, the $SbCl_5$ is recovered from the catalyst solution by an extraction with HCl, then the antimony is cemented out of the acidic solution by means of a "less noble" metal. Subsequently, the antimony has to be chlorinated with chlorine to form $SbCl_5$. This method disadvantageously needs hydrochloric acid and a reducing metal as auxiliary chemical substances on the one hand and produces undesired waste products on the other hand. Moreover, this method is uneconomical because of the reduction of the antimony chlorides to antimony which subsequently has to be rechlorinated to $SbCl_5$.

It is furthermore known that $SbCl_5$ can be thermally decomposed into $SbCl_3$ and chlorine. When chlorine is removed from the reaction mixture, the equilibrium is shifted completely to the side of $SbCl_3$. The rate of thermal decomposition depends on the temperature, i.e. it increases with rising temperature. The separation of $SbCl_5$ and $SbCl_3$ by means of distillation can be carried out only in pure mixtures. The used catalyst solutions are multicomponent systems wherein $SbCl_5$ is very easily soluble, but $SbCl_3$ is only sparingly soluble (2–3%), and complicates the separation by distillation.

A process for the recovery of $SbCl_5$ from catalyst solutions used for the fluorination of chlorinated hydrocarbons has now been found which comprises:
(a) converting antimony fluorides which are dissolved in the catalyst solution into antimony chlorides by heating, and concentrating the catalyst solution by distilling off the halogenated hydrocarbons,
(b) thermally decomposing the $SbCl_5$ contained in the concentrated catalyst solution into $SbCl_3$ and chlorine at a temperature of from 60° to 300° C.,
(c) separating the organic impurities by extracting the processed catalyst solution with halogenated hydrocarbons at a temperature of from 100° to 10° C.,
(d) oxidizing the residue containing $SbCl_3$ with chlorine at a temperature of from 60° to 150° C. and under a pressure of from 0 to 5 atmospheres to obtain $SbCl_5$, and
(e) separating the recovered $SbCl_5$ from the inorganic impurities by distillation at a temperature of from 10 to 100° C. under reduced pressure.

The process for the recovery of $SbCl_5$ is based on an exhausted catalyst solution. This solution contains, besides halogenated, preferably chlorinated and/or fluorinated, hydrocarbons inorganic and organic impurities, for example $FeCl_3$ and hexachloro-ethane, and besides antimony chlorides also antimony fluorides ($SbF_3$ and $SbF_5$). The latter are converted into antimony chlorides by refluxing of the catalyst solution for several hours, preferably at a temperature of from 40° to 130°. Simultaneously or subsequently, halogenated hydrocarbons, for example $CCl_4$, $C_2HF_3$, $C_2Cl_4F_2$ or $C_2Cl_3F_3$, are distilled off until a temperature on top of from 60° to 160° C., preferably of from 80° to 130° C., is attained. It is also possible to primarily add chlorinated hydrocarbons to the exhausted catalyst solution, in order to convert the antimony fluorides into the corresponding chlorides. The fluorinated hydrocarbons simultaneously formed are removed by distillation up to the cited temperature on top. Thus, the catalyst solution is concentrated to about two-thirds of its original volume.

The concentrated catalyst solution is subsequently heated to a temperature of from 80 to 250° C. The chlorine formed by the decomposition of the $SbCl_5$ escapes and may be recycled for use in the rechlorination step. After the reduction of the $SbCl_5$ to $SbCl_3$, the organic impurities of the catalyst solution, for example solid fluorinated and chlorinated hydrocarbons, such as hexachloro-ethane, are extracted by halogenated hydrocarbons at a temperature of from 100° to 10° C. Advantageously, those halogenated hydrocarbons are used which have been obtained during the distillation of the exhausted catalyst solution. At the elevated temperatures, also the $SbCl_3$ is dissolved to a considerable extent. Thus, cooling is necessary to precipitate most of the $SbCl_3$ whereas the organic impurities remain dissolved. A small amount of the $SbCl_3$ is extracted together with the solvent of extraction, but it can be recovered quantitatively by distillation of the solvent of extraction. This separation of the $SbCl_3$ which corresponds to a recrystallization can be repeated several times. It is recommended to use pure $CCl_4$ for the last separation operations, since it can be recycled and used in the first separation step.

After complete elimination of the organic impurities, the $SbCl_3$ is oxidized with chlorine at a temperature of from 70° to 150° C., preferably of from 75° to 140° C., in order to obtain $SbCl_5$. It is advantageous to use an excess pressure of the chlorine of from 0 to 4 atmospheres/gage, but this is not obligatory. It is possible to use the chlorine obtained by the thermal decomposition for the rechlorination. Depending on the amount of $SbCl_3$ in the exhausted catalyst solution, an addition of further chlorine may be necessary.

After rechlorination of the $SbCl_3$, the $SbCl_5$ contains only inorganic impurities originating from the reactor material, for example $FeCl_3$. The $SbCl_5$ can be separated from these impurities by distillation under reduced pressure at a temperature of from 10° to 100° C., preferably of from 20° to 80° C., the pressure being of from 5 to 200 mm. Hg.

The process of the invention may generally be employed for the separation of inorganic and organic impurities from solutions containing antimony halides. It may be carried out discontinuously as single pot process, or continuously in a closed cycle system. Apart from the fact that no auxiliary chemical substances are needed, the process does not require much expenditure of apparatus and, in a continuous operation, it is profitable on account of the reutilization of the chlorine and the high yield of more than 95% of recovered $SbCl_5$. No toxic waste gases or other wastes are produced in this process. On the contrary, valuable by-products are obtained from the solvent of extraction, and, on the other hand, a complete elimination of the undesired hexachloro-ethane from the catalyst solution is achieved.

The following examples illustrate the invention.

EXAMPLE 1

In the first step, 1000 g. of an exhausted catalyst solution containing 23.8% of antimony (about 96% of it as $Sb^{5+}$) are heated for 4 hours with 500 g. of $CCl_4$; thereby removing the products having a boiling point of 60° C. or less by distillation. During this operation, the amount of antimony fluorides dissolved in the catalyst solution decreases from 2% to 0.05%. Subsequently, the halogenated hydrocarbons, for example $CCl_4$, $C_2HCl_3F_2$, $C_2Cl_4F_2$ or $C_2Cl_3F_3$, are distilled off. The temperature on top rises up to 130° C. In the second step, the catalyst solution which has been concentrated to two thirds of its original volume is refluxed for 14 hours at 186° C. 133 g. of $Cl_2$ are escaping during the course of this operation. In the third step, the processed catalyst solution is boiled two times with the distillates of the first step and subsequently two times with 250 ml. each of $CCl_4$. After cooling to room temperature, in each case the solution of extraction is removed from the precipitate by filtration. In the fourth step, the residue of the third step is chlorinated at 75° C. and under a pressure of 4 atmospheres/gage. 133 g. of chlorine are consumed. After the chlorination, in the fifth step the inorganic impurities are removed from the $SbCl_5$ by distillation at 100° C. under reduced pressure. The $SbCl_5$ obtained has a very high degree of purity, and no halogenated hydrocarbons can be detected in it by gas chromatography.

In the combined solvents of extraction from the third step, apart from the organic extracts, 67 g. of $SbCl_3$ are dissolved. When the continuous mode of operation is chosen, this $SbCl_3$ is separated from the solvents of extraction and the organic extracts by distillation, and then added to the fourth step for rechlorination. Including the $SbCl_5$ recovered from the combined solvents of extraction, 574 g. of $SbCl_5$ are obtained, which corresponds to a yield of 98%.

EXAMPLE 2

1000 g. of catalyst solution containing 29.4% of antimony (composed of 55% of $Sb^{3+}$ and 45% of $Sb^{5+}$) and 4.1% of hexachloro-ethane are heated for 3 hours with 500 g. of $CCl_4$, thereby removing the products having a boiling point of 60° C. or less by distillation. During this operation the amount of antimony fluoride decreases from 0.5% to 0.04%. The catalyst solution which has been concentrated to two thirds of its original volume is treated as described for the second to fifth step of Example 1. During the thermal decomposition, 77 g. of $Cl_2$ are freed. The rechlorination requires 170 g. of $Cl_2$. Working in a discontinuous mode of operation, the yield of $SbCl_5$ is 678 g., which corresponds to 94%.

What is claimed is:

1. A process for the recovery of $SbCl_5$ from catalyst solutions used for the fluorination of chlorinated hydrocarbons, said solutions containing trivalent and pentavalent antimony chlorides and fluorides, halogenated hydrocarbons and organic and inorganic impurities, comprising the steps of:
    (a) converting antimony fluorides into their respective antimony chlorides by refluxing the catalyst solution and concentrating the catalyst solution by distilling off halogenated hydrocarbons;
    (b) thermally decomposing the pentavalent antimony chloride contained in the concentrated catalyst solution to trivalent antimony chloride and chlorine, by heating the concentrated catalyst solution at a temperature of from 60 to 300° C.;
    (c) separating the organic impurities by extracting said concentrated solution with halogenated hydrocarbons at a temperature between 10 and 100° C.;
    (d) oxidizing the residue left after said extraction, containing trivalent antimony chloride, with chlorine at a temperature of from 60 to 150° C. to form pentavalent antimony chloride; and
    (e) separating the pentavalent antimony chloride from inorganic impurities by distillation at a temperature of from 10 to 100° C. under reduced pressure.

2. A process as claimed in claim 1, wherein antimony fluorides are converted into their respective antimony chlorides by refluxing the catalyst solution in the presence of supplementally added chlorinated hydrocarbons.

3. A process as claimed in claim 1, wherein the thermal reduction of the $SbCl_5$ to $SbCl_3$ and chlorine is carried out at a temperature of from 80° to 250° C.

4. A process as claimed in claim 1, wherein the chlorinated hydrocarbons distilled off the catalyst solution are used for the separation of the organic impurities.

5. A process as claimed in claim 1, wherein the oxidation of $SbCl_3$ with chlorine is carried out at a temperature of from 75° to 140° C. and under a pressure of from 0 to 4 atmospheres/gage.

6. A process as claimed in claim 1, wherein the chlorine obtained in the thermal reduction of the $SbCl_5$ is used for the oxidation of $SbCl_3$.

7. A process as claimed in claim 1, wherein the recovered $SbCl_5$ is separated from the inorganic impurities by distillation at a temperature of from 20° to 80° and under a pressure of from 5 to 200 mm. Hg.

References Cited

UNITED STATES PATENTS

| | | | |
|---|---|---|---|
| 2,510,872 | 6/1950 | Downing | 423—88 |
| 2,605,211 | 7/1952 | Deters | 423—87 X |
| 3,278,259 | 10/1966 | Oelderik | 423—88 |

EDWARD STERN, Primary Examiner

U.S. Cl. X.R.

23—312; 423—87, 491